United States Patent
Brooks et al.

(10) Patent No.: US 7,143,432 B1
(45) Date of Patent: Nov. 28, 2006

(54) SYSTEM FOR TRANSFORMING STREAMING VIDEO DATA

(75) Inventors: Roger K. Brooks, Palo Alto, CA (US); Stephen A. Molloy, Los Gatos, CA (US); Chi-Te Feng, Hsi Chih (TW); Qing Zhang, Sunnyvale, CA (US); Yanda Ma, Milpitas, CA (US); Dave Singhal, San Jose, CA (US)

(73) Assignee: Vidiator Enterprises Inc., Nassau (BS)

( * ) Notice: Subject to any disclaimer, the term of this patent is extended or adjusted under 35 U.S.C. 154(b) by 0 days.

(21) Appl. No.: 09/502,409

(22) Filed: Feb. 10, 2000

Related U.S. Application Data

(60) Provisional application No. 60/157,468, filed on Oct. 1, 1999.

(51) Int. Cl.
*H04N 7/173* (2006.01)

(52) U.S. Cl. .............. 725/105; 725/109; 725/114; 725/115; 725/117; 725/118; 709/231; 709/235; 709/203; 709/247; 375/240.24; 375/240.25; 375/240.26; 370/437

(58) Field of Classification Search .......... 375/240.02, 375/240.24, 240.11, 240.01, 240.25, 240.26; 370/420, 398, 437; 725/118, 105, 114, 109, 725/115, 117; 709/247, 246, 231, 235, 203
See application file for complete search history.

(56) References Cited

U.S. PATENT DOCUMENTS

| | | | |
|---|---|---|---|
| 5,619,995 A * | 4/1997 | Lobodzinski ............... 348/398 |
| 5,671,319 A | 9/1997 | Ueda .......................... 386/96 |
| 5,768,535 A | 6/1998 | Chaddha et al. ....... 395/200.77 |
| 5,903,775 A | 5/1999 | Murray ....................... 395/853 |
| 5,914,751 A | 6/1999 | Korth ......................... 348/409 |
| 5,970,233 A * | 10/1999 | Liu et al. .................... 709/246 |
| 6,011,868 A | 1/2000 | van den Branden et al. ........................ 382/233 |
| 6,028,639 A | 2/2000 | Bhatt et al. ................. 348/441 |
| 6,091,777 A * | 7/2000 | Guetz et al. ........... 375/240.11 |
| 6,141,447 A * | 10/2000 | Linzer et al. ............... 382/236 |
| 6,141,693 A | 10/2000 | Perlman et al. ............ 709/236 |

(Continued)

*Primary Examiner*—Shawn S. An
(74) *Attorney, Agent, or Firm*—Seed IP Law Group PLLC

(57) ABSTRACT

According to one embodiment, a circuit configured to form an output video stream includes a resolution modification circuit configured to receive a plurality of video frames from a frame buffer, and configured to modify resolution of the plurality of video frames, when the desired resolution for the output video stream is different than a resolution of the input video stream, the plurality of frames of data derived from an input video stream, a frame reducing circuit coupled to the resolution reducing circuit configured to reduce a number of video frames in the plurality of video frames from the resolution reducing circuit, when a desired frame rate for the output video stream is different than a frame rate of the input video stream, a depth reduction circuit coupled to the frame reducing circuit configured to reduce bit depth of the plurality of video frames from the frame reducing circuit, when a desired bit depth for the output video stream is different than a bit depth of the input video stream, and a rate reduction circuit coupled to the depth reduction circuit, configured to scale the plurality of video frames from the depth reduction circuit, in response to a desired bit rate for the output video stream, and an encoder coupled to the rate reduction circuit, configured to encode the plurality of video frames from the rate reduction circuit into the output video stream is also contemplated.

17 Claims, 8 Drawing Sheets

U.S. PATENT DOCUMENTS

| | | | |
|---|---|---|---|
| 6,141,709 A | 10/2000 | Cutter | 710/100 |
| 6,160,544 A | 12/2000 | Hayashi et al. | 345/327 |
| 6,236,395 B1 | 5/2001 | Sezan et al. | 345/328 |
| 6,275,536 B1 | 8/2001 | Chen et al. | 375/240.25 |
| 6,292,834 B1 | 9/2001 | Ravi et al. | 709/233 |
| 6,298,385 B1 | 10/2001 | Sparks et al. | 709/233 |
| 6,343,313 B1 | 1/2002 | Salesky et al. | 709/204 |
| 6,398,245 B1 | 6/2002 | Gruse et al. | 280/228 |
| 6,490,627 B1 | 12/2002 | Kalra et al. | 709/231 |
| 6,505,299 B1 | 1/2003 | Zeng et al. | 713/160 |
| 6,525,746 B1 | 2/2003 | Lau et al. | 345/725 |
| 6,567,986 B1 * | 5/2003 | Ward et al. | 725/118 |
| 6,795,863 B1 * | 9/2004 | Doty, Jr. | 709/231 |

* cited by examiner

SYSTEM FOR TRANSFORMING STREAMING VIDEO DATA

CROSS-REFERENCES TO RELATED APPLICATIONS

The present invention disclosure claims priority to Provisional U.S. patent application Ser. No. 60/157,468, filed Oct. 1, 1999, entitled Internet Camera Video Producer. This application is herein by incorporated by reference for all purposes.

BACKGROUND OF THE INVENTION

The present invention relates to devices for providing media across a computer network. In particular, the present invention relates to systems configured to adapt input streams of video data to meet desired parameters for output streams of video data.

The legend of the Tower of Babel tells us that humans once spoke a common language. However, divine intervention soon foiled human's plans in the building of the tower to the sky. This was done by making humans speak in different languages. As a result, the legend goes, humans did not understand each other, humans misunderstood others' intentions, and ultimately humans moved away from each other. Ever since that day, humans have been benefited and plagued by language and cultural differences.

Translating between different languages has also been an issue considered in popular fiction. In Douglas Adam's well-known Hitchhiker's Guide to the Galaxy (1979), the problem of different languages was solved by the introduction of a "Babel fish." Adams described the Babel fish as a "small, yellow and leechlike, and probably the oddest thing in the Universe. It feeds on the brainwave energy received not from its own carrier but from those around it. It absorbs all unconscious mental frequencies from this brainwave energy to nourish itself with. It then excretes into the mind of its carrier a telepathic matrix formed by combining the conscious thought frequencies with nerve signals picked up from the speech centers of the brain which has supplied them. The practical upshot of all this is that if you stick a Babel fish in your ear you can instantly understand anything said to you in any form of language." While this, of course, may not really exist, a commercial translation service has actually been named after the Babel fish.

On the Internet, Altavista.com provides a translation service that translates text in a web page from one selected language to another selected language. The tool is called the "Babel fish." To use this tool, the user enters a web address and then specifies the language direction, e.g. English to French. In response, the Babel fish will translate the text that appears on the page into the new language, all other aspects of the page will remain the same. The quality of the translations may vary with actual usage. For example, translating the phrase "To jump the gun" to French and back into English returns the phrase "To connect the gun." As can be seen, the quality of such services are not quite ideal. Further, such services do not address non-text data such as audio and visual (media) data.

On the web, other types of data than text are also displayed to users. Such data include media such as images, sounds, video, and the like. With such data, instead of being in different languages, the data are stored and transmitted into different formats. Most of the different media formats are incompatible. Currently, there are a multitude of standards or formats for each of them, for example, images may be transmitted in formats including *.jpg, *.gif, *.bmp, *.pcx, and the like; sounds may be transmitted in formats including *.wav, *.mp3, *.aiff, and the like; and video may be transmitted in formats including *.avi, *.mov, *.rm, *.mpg, *.asf, vivo and the like.

To view or hear data in any of the above media formats requires an appropriate viewing (translation) application program. That is, an application program is required to decode the transmitted data and output the data to the computer of the requester. The requesting computer must have preinstalled many different viewer applications. This is so that the computer can receive, decode, and display data stored in the many different media formats.

One drawback to requiring multiple viewers is that this solution is not appropriate for all devices connected to the web. In particular, it is not appropriate for future wireless devices, or the like. Such devices may include cellular telephones, wireless PDAs, network appliances (refrigerators, toasters, ovens, smart houses), wrist watches, wearable computers, and the like. Because many of these devices will have lower amounts of memory and performance compared to desktop computers, these devices will not be able to display a large number of viewers. As a result, these devices will not be able to play many different media formats.

One solution proposed to address this problem has been to standardize upon one particular format. For example, all wireless devices in the future would be able to receive and output data stored in one particular media format, such as MPEG-4 (Motion Pictures Expert Group), or the like.

A drawback to this solution is that in theory, this solution is reasonable, however, in practice, it is not likely to happen. The primary reason is that there are many competing media formats available, and most are backed by separate companies. For example, Windows pushes the *avi media format, Apple pushes the *.mov media format, Real Networks pushes the *.rm format, Vivo Software pushes its own format, and the like. It is doubtful that such companies will agree on a single media format.

Another drawback is that even if there is one standardized media format, different requesting devices will have different performance, resolutions, bandwidth, and the like. For example, a PDA may have the ability to display 80×60 pixel 24-bit color images, however a wrist watch may have the ability to display only 40×30 pixel 8-bit gray scale images, and the like. Because many future wireless network devices or appliances will have different performance, bandwidth, and the like, the source of the media will have to store the data in just as many data files. For example, if there are 100 different telephones with web access, each telephone with its own performance, bandwidth factors, and the like, to support all these telephones the media source will have to store the data in 100 different data files. This is highly inefficient and/or impractical to implement, not to mention impossible for live data.

Typically, media sources, such as web sites, provide only a limited number of media formats and performance characteristics. For example, a typical site may only offer a media clip in the Quicktime format at 320×240 resolution or 160×120 resolution. If a requesting device cannot process Quicktime format, the user is out of luck. As another example, if the requesting device can only play 80×60 resolution Quicktime movies, the media source is wasting its output bandwidth sending the requesting device 160×120 resolution Quicktime movies.

Thus what is needed in the industry are improved systems for providing requesting devices with media in the format and performance appropriate and/or requested for these requesting devices.

SUMMARY OF THE INVENTION

The present invention relates to systems for transcoding and transforming video streams. In particular, the present invention relates to apparatus for adapting input streams of video data to meet desired parameters for output streams of video data. On the fly adaptation to desired output parameters may be made with respect to display size, frame rate, bit-depth, bit rate, encoding format, and the like.

According to one embodiment, a circuit configured to form an output video stream includes a resolution modification circuit configured to receive a plurality of video frames from a frame buffer, and configured to modify resolution of the plurality of video frames, when the desired resolution for the output video stream is different than a resolution of the input video stream, the plurality of frames of data derived from an input video stream, and a frame reducing circuit coupled to the resolution reducing circuit configured to reduce a number of video frames in the plurality of video frames from the resolution reducing circuit, when a desired frame rate for the output video stream is different than a frame rate of the input video stream. The circuit also includes a depth reduction circuit coupled to the frame reducing circuit configured to reduce bit depth of the plurality of video frames from the frame reducing circuit, when a desired bit depth for the output video stream is different than a bit depth of the input video stream, and a rate reduction circuit coupled to the depth reduction circuit, configured to scale the plurality of video frames from the depth reduction circuit, in response to a desired bit rate for the output video stream. An encoder coupled to the rate reduction circuit, configured to encode the plurality of video frames from the rate reduction circuit into the output video stream is also contemplated.

According to another embodiment, a circuit for reducing bandwidth of an incoming video stream includes a cropping portion configured to receive a first video frame, a second video frame, and a third video frame from a frame buffer, and configured to determine the resolution of the first video frame, the second video frame, and the third video frame, the first video frame, the second video frame, and the third video frame derived from the incoming video stream, and a sampling portion coupled to the cropping portion, configured to receive a desired output resolution, and configured to subsample the first video frame, the second video frame, and the third video frame to respectively form a first sampled video frame, a second sampled video frame, and a third sampled video frame. The circuit may also include a frame rate reducing portion coupled to the sampling portion, configured to receive a desired output frame rate, and configured to drop the second sampled video frame, and a depth reducing portion coupled to the frame rate reducing portion, configured to receive a desired output bit-depth, and configured to reduce bit depth of the first sampled video frame and the third sampled video frame to respectively form a first reduced video frame and a third reduced video frame.

According to yet another embodiment, a circuit for dynamically reducing bandwidth of an input video stream to meet bandwidth requirements for an output video stream includes a receiving portion configured to receive frames of data derived from the input video stream, a processing portion coupled to the receiving portion, configured to receive a bandwidth requirement for the output video stream, and configured to reduce bandwidth used by the frames of data in response to the bandwidth requirement to form bandwidth reduced frames of data, and an encoding portion coupled to the processing portion, configured to receive an encoding format for the output video stream, and configured to encode bandwidth reduced frames of data to form the output video stream.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE SPECIFIC EMBODIMENTS

Figure 1:
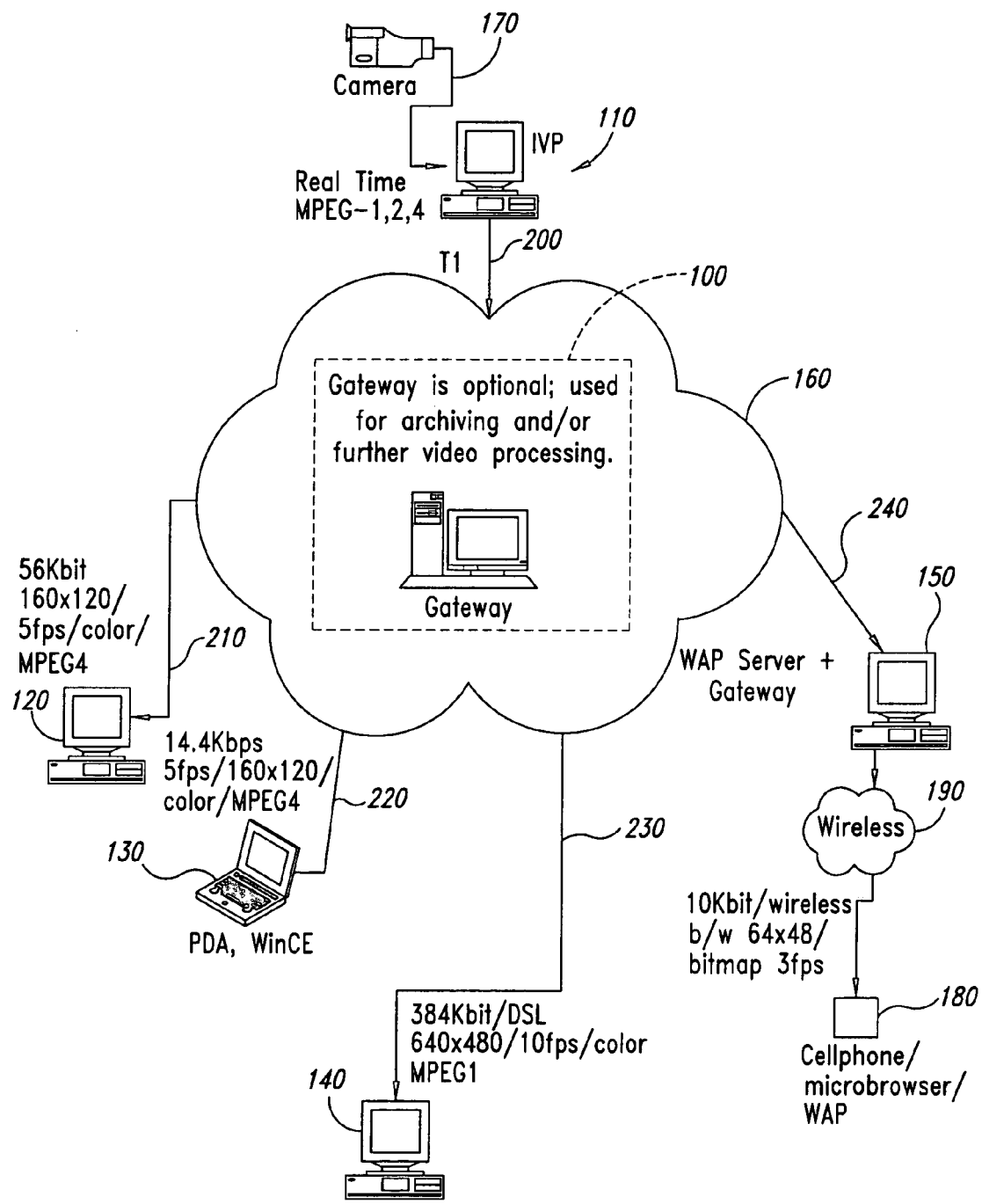
FIG. 1 illustrates a block diagram of a usage scenario according to an embodiment of the present invention.

FIG. 1 illustrates a block diagram according to an embodiment of the present invention. FIG. 1 illustrates a gateway computer 100, and plurality of computer systems 110–150 coupled to each other via a computer network 160. In the present embodiment, a video camera 170 is coupled to computer system 110, and a network appliance 180 is coupled via a wireless network 190 to computer system 150. Computer systems 110–150 are coupled to computer network 160 via network connections 200–240.

In the present embodiment, computer network 160 is the Internet. In alternative embodiments of the present invention, computer network 160 may be any computer network, such as an intranet, a computer network, a local area network, an internet, and the like. Computer network 160 provides data communication among computer systems 110–150 and gateway computer 100. Data communication may include transfer of HTML based data, textual data, form submissions, plug-in programs or viewers, applets, audio data, video data, and the like. Although computer network 160 is illustrated as a single entity, as is the case with the Internet, it should be understood that computer network 160 may actually be a network of individual computers and servers.

In the present embodiment, network connections 190–240 have typical maximum bandwidth characteristics that are known a priori. In FIG. 1, for example, network connection 200 is shown as a 1.5 mega bit per second (Mbps) TI correction, as is common with businesses; network connection 210 is shown as a 56 kilobit per second (kbps) connection as is common with home computers, set top boxes, and the like; network connection 220 is shown as a 14.4 kbit (kbps) connection to personal digital assistants (PDAs), such as PalmOS devices, WindowsCE devices, and the like. In this example, network connection 230 is shown as a 384 kbps digital subscriber line (DSL) connection as is common with small businesses or power users. In alternative embodiments, network connection 230 may be smaller or greater than 384 kbps, for example 1 mbps downstream and 500 kbps upstream, or the like. In embodiments of the present invention, other speeds of network connections are envisioned. Further, in practice, many network connection speeds may vary greatly with network traffic, time of day, and the like.

In FIG. 1, network connection 190 is shown as a 10 kbps connection as is currently planned for typical network appliances. The connection rate may vary, and may increase in alternative embodiments of the present invention. For example, alternative embodiments of network appliances may include wireless modems that may range in speeds of up to 128 kbps, or the like. It is believed that slower rates may be more widely utilized in typical network appliances to keep the cost of such appliances down.

In the present embodiment, computer systems 110, 120, 140, and 150 are embodied as typical personal computers such as those available from companies such as HP, Compaq, IBM, and the like. Such personal computers are typically powered by microprocessors such as the Athlon processor available from AMD and include operating systems such as Windows98 from Microsoft. In alternative embodiments, other personal computers such as those available from Apple or Dell, may also be used. Computer systems 110 and 140 are typically desktop computers. Computer system 120 may be a desktop computer, a laptop computer, a television set top box, such as from WebTV Networks, game consoles such as the Dreamcast, a network computer, or other types of units incorporating processors, microcontrollers, ASICs, and the like.

Computing systems 110, 120, 140, and 150 are typically connected to computer network 160 via local area networks, via dial-up modems, ISDN, DSL, cable modems, satellite modems, or the like.

In the present embodiment, computer system 130 typically includes PDAs or other portable computing platforms. Such PDAs may operate on a variety of operating system platforms including PalmOS, WindowsCE, or the like. Further, such PDAs operate on a variety of processors. Such devices are typically coupled to computer network 160 via telephone lines, or other wire-based network connections.

In the present embodiment, network appliance 180 may include wireless telephones including cellular technology, CDMA, TDMA, and other technologies. In other examples, network appliances may include kiosks, wrist watches, pocket or portable displays or terminals, wearable computers, retinal implants, surveillance equipment, kitchen appliances, and the like.

These devices are typically coupled to computer network 160 via computing system 150 and wireless network 190. In one embodiment of the present invention, computing system 150 is a wireless application protocol server (WAP) that provides data to and from network appliance 180 in the WAP format. In alternative embodiments, other standard and/or proprietary formats may also be used.

In the present embodiment, computer systems 120–140 and network appliance 180 include application software that communicates using the HTTP, TCP/IP, and/or RTP/RTSP protocols. These communication protocols are well known, thus no description is given herein. The application software is typically embodied as a web browser (client), in one embodiment. Further, the software is typically able to display *.gif, and/or *.jpg format images. For computer systems 120 and 140, the web browser software may be embodied as Netscape Navigator 4.x, Microsoft's Internet Explorer 5.x, or the like. In alternative embodiments of the present invention, other transfer and communication protocols may also be used, for example IPX, or the like. Further, different web client software may be used in other embodiments.

In the present embodiment, it is envisioned that video data will be transferred from computing system 110 to computer systems 120–150 and onto network appliance 180. The video data may also be provided by gateway computer 100. In one example, video data is stored on computing system 110 in a variety of formats including MPEG1, MPEG2, and MPEG4, as are well known in the art. In alternative embodiments other video formats are envisioned and may include the Windows *.avi format, the Quicktime *.mov format, or the like. In other embodiment, streaming video formats may be used to provide video data, for example formats from RealNetworks, Microsoft, Apple, or the like. In the present embodiment, the streaming video may be from a stored video archive, or from a live video camera 170, or the like. Whether archived or live, the video is typically output by computing system 110 onto computer network 160.

As illustrated in the examples in FIG. 1, computing systems 120–140 and network appliance 180 are all coupled to computer network 160 with different bandwidth limited connections. Further, computing systems 120–140 and network appliance 180 typically have different processing power, display capabilities, memory, operating systems, and the like. As a result of these differences, each system have different abilities to receive, process, and display video data.

In the example in FIG. 1, the bandwidth of network connection 230 between computing system 140 and computer network 160 is a DSL connection. As illustrated in FIG. 1, because the bandwidth is relatively large, network connection 230 is capable of providing computing system 140 with enough video data to display up to a 640×480 pixel color image at 10 frames per second (fps) using an MPEG1 format. In alternative embodiments, other configurations are envisioned, for example, 320×240 monochromatic image at 30 fps, or the like.

In the example in FIG. 1, the bandwidth of network connection 210 between computing system 120 and computer network 160 is limited to 56K by the modem. As illustrated in FIG. 1, because the bandwidth is relatively small, network connection 210 is capable of providing computing system 120 with enough video data to display up to a 160×120 color image at 5 fps using an MPEG4 format. As above, in alternative embodiments, other video configurations are envisioned, for example, a 80×60 4-bit image at 25 fps, or the like.

Still further, in the example in FIG. 1, the bandwidth of network connection 220 between computing system 130 and computer network 160 is limited to 14.4 kbps by the modem. As illustrated in FIG. 1, because the bandwidth is small, network connection 220 is capable of providing computing system 130 with enough video data to display up to a 160×120 256 color (8-bit color) image at 5 fps. As above, in alternative embodiments, other video configurations are envisioned, for example, a 80×60 16 gray scale (4-bit) image at 10 fps, or the like.

Also in the example in FIG. 1, the bandwidth of wireless network 190 between network appliance 180 and computer network 160 is limited to 10 kbps. As illustrated in FIG. 1, because the bandwidth is very small, wireless network 190 is capable of providing network appliance 180 with enough video data to display up to a 64×48 black and white image at 3 fps. As above, in alternative embodiments, other video configurations are envisioned, for example, a 32×24 black and white image at 10 fps, or the like.

In the present embodiment, gateway computer 100 is coupled to computer network 160 and is configured to provide video data to computer systems 120–140 and network appliance 180. In particular, in the present embodiment, gateway computer 100 is configured to receive video data from computer system 110 and to provide video data to each device according to that device's bandwidth limitations, and in the output format desired. In this example, gateway computer 100 delivers a stream of video data to computer system 120 that represents a 160×120 resolution color image at 5 fps, in the MPEG4 format; gateway computer 100 delivers a stream of video data to network appliance 180 that represents a 64×48 resolution black and white image at 3 fps, in a custom format; and the like. Further details regarding gateway computer 100 are given below.

The diagram in FIG. 1 is merely an illustration which should not limit the scope of the claims herein. One of ordinary skill in the art would recognize many other variations, modifications, and alternatives.

Figure 2:
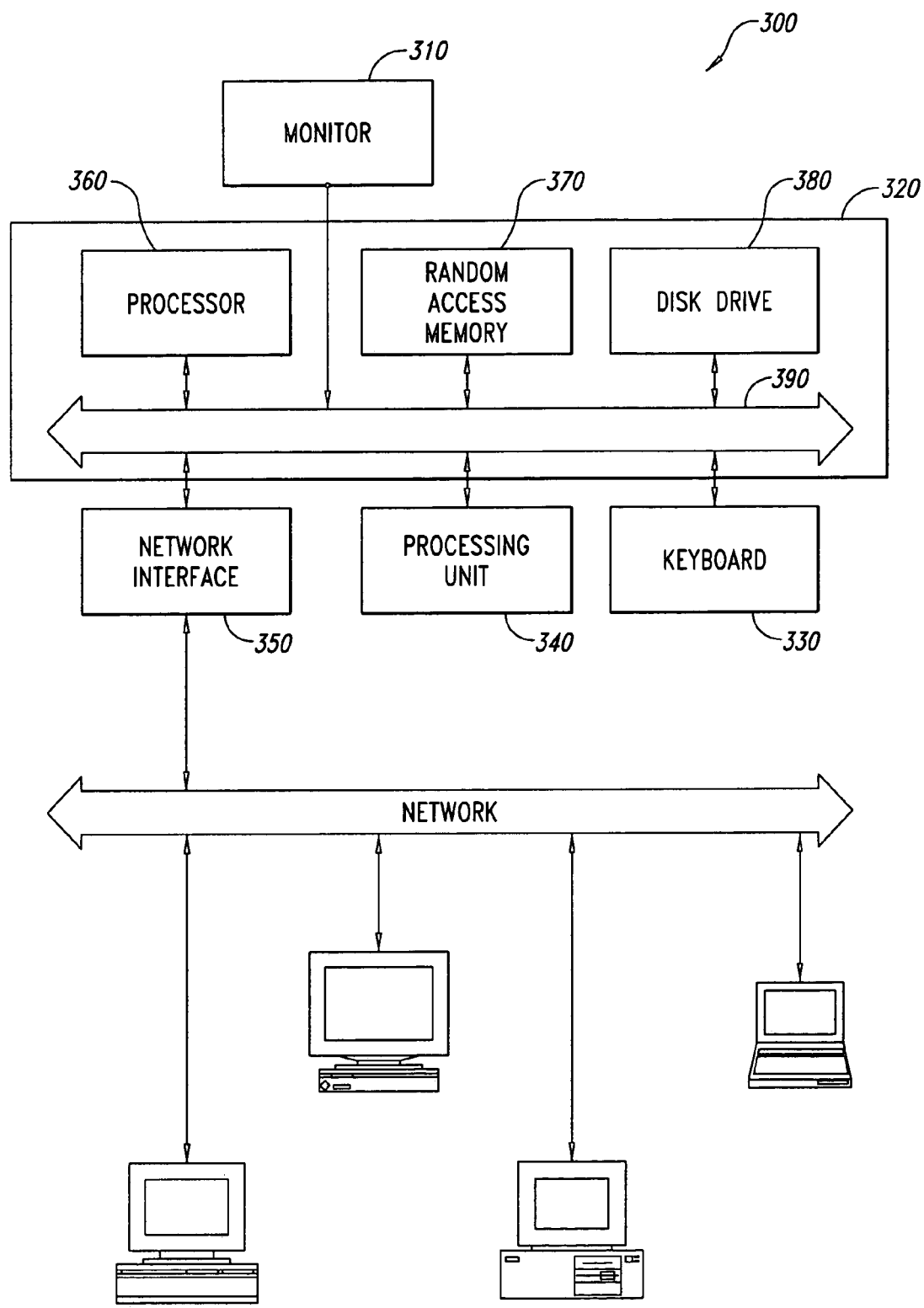
FIG. 2 is a block diagram of a typical gateway computer and its interface to client computers according to an embodiment of the present invention.

FIG. 2 is a block diagram of a typical gateway computer 300 according to an embodiment of the present invention. Gateway computer 300 typically includes a monitor 310, a computer 320, a keyboard 330, a graphical input device, a processing unit 340, a network interface 350, and the like.

In the present embodiment, a graphical input device is typically embodied as a computer mouse, a trackball, a track pad, wireless remote, and the like. Graphical input devices typically allow the users to graphically select objects, icons, text and the like output on monitor 310 in combination with a cursor.

Processing unit 340 is typically embodied as a high bandwidth PC bus, such as the PCI and the like, plug-in card into computer 320. In the present embodiment, processing unit 340 provides much of the functionality that will be described below. Presently, processing unit 340 is a plug-in board, that is not yet currently available from Luxxon Corporation, the assignee of the present invention. In alternative embodiments of the present invention, the functionality provided by processing unit 340 may be implemented on a host computer 320 as software. In such a case, little additional hardware is typically needed.

Embodiments of network interface 350 include an Ethernet card, a modem (telephone, satellite, cable, ISDN), (asynchronous) digital subscriber line (DSL) units, and the like. Network interface 350 is coupled to a typical network as shown.

Computer 320 includes familiar computer components such as a processor 360, and memory storage devices, such as a random access memory (RAM) 370, a disk drive 380, and a system bus 390 interconnecting the above components.

In one embodiment, computer 320 is a PC compatible computer having an x86 based microprocessor, such as an Athlon microprocessor from Advanced Micro Devices, Inc. Further, in the present embodiment, computer 320 typically includes a WindowsNT operating system from Microsoft Corporation.

RAM 370 and disk drive 380 are examples of tangible media for storage of data, audio message files, computer programs, browser software, embodiments of the herein described invention, applet interpreters or compilers, virtual machines, and the like. Other types of tangible media include floppy disks, removable hard disks, optical storage media such as CD-ROMS and bar codes, semiconductor memories such as flash memories, read-only-memories (ROMS), and battery-backed volatile memories, and the like. In embodiments of the present invention such as set top boxes, mass storage, such as disk drive 380, and the like may be dispensed with.

In the present embodiment, gateway computer 300 also includes software that enables it to act as a server that communicates with computer systems 120–140 and network appliance 180 using the HTTP, TCP/IP, and/or RTP/RTSP protocols. In alternative embodiments of the present invention, other software and transfer and communication protocols may also be used, for example IPX, UDP or the like.

FIG. 2 is representative of but one type of system for embodying the present invention. It will be readily apparent to one of ordinary skill in the art that many other hardware and software configurations are suitable for use with the present invention. For example, other types of processors are contemplated, such as the Pentium -class or a Celeron-class microprocessor from Intel Corporation, K6-x -class microprocessors from Advanced Micro Devices, PowerPC G3, G4 microprocessors from Motorola, Inc., and the like. Further, other types of operating systems are contemplated, such as Solaris, LINUX, UNIX, MAC OS 9 from Apple Computer Corporation, BeOS, and the like.

Figure 3:
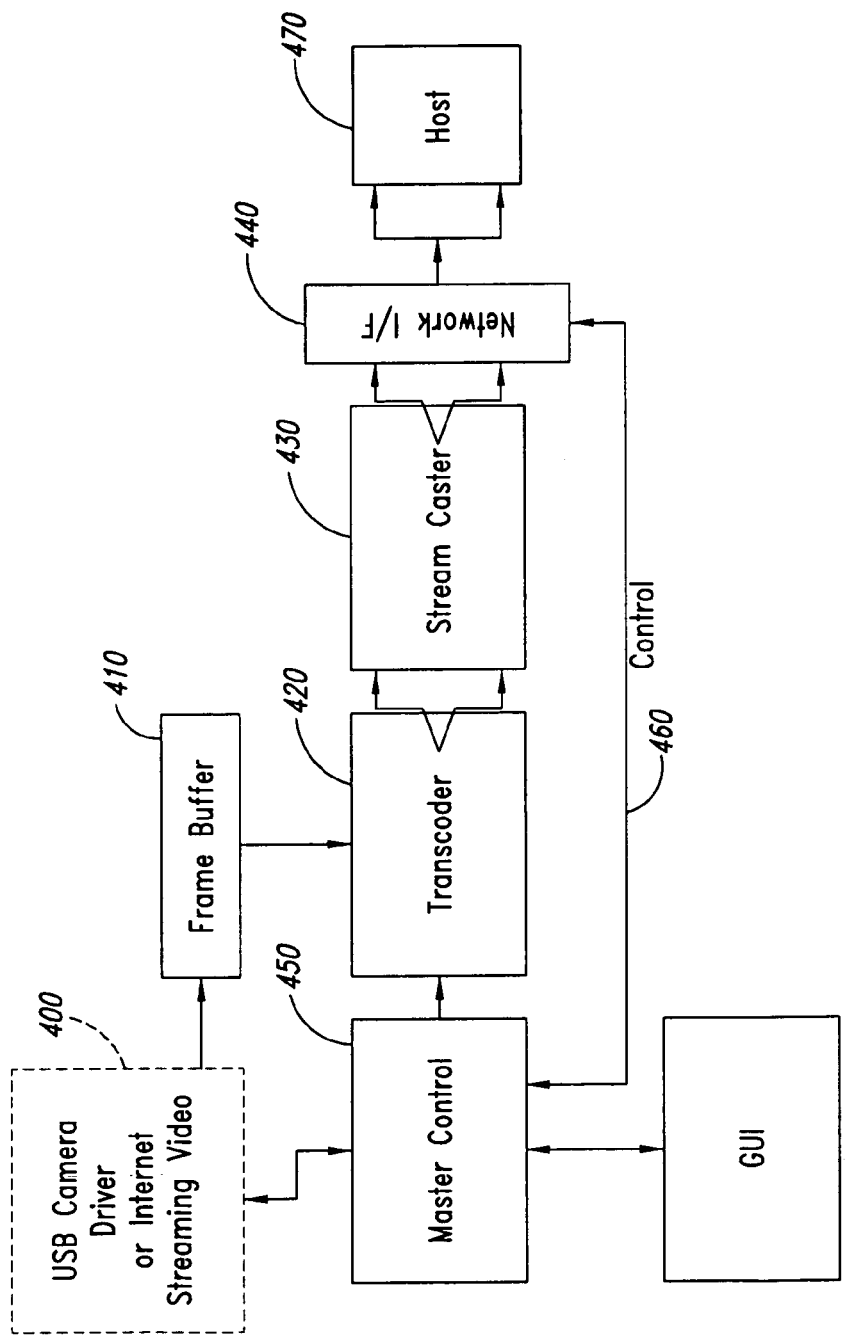
FIG. 3 illustrates a block diagram of an embodiment of the present invention.

FIG. 3 illustrates a block diagram of an embodiment of the present invention. In particular, FIG. 3 illustrates a logical block diagram of one embodiment of processing unit 340, in FIG. 2. FIG. 3 includes a data acquisition block 400, a frame buffer 410, a transcoder block 420, a stream caster block 430, a network interface block 440, and a control block 450. These blocks are illustrated coupled to each other and to a computer network 470.

In the present embodiment, data acquisition block 400 provides the input of a stream of video data. In one embodiment, of the present invention, a video camera, such as a universal serial bus (USB) video camera, may be coupled to a computer such as gateway computer 300. The video camera provides a stream of input video data, and the stream of input video is then typically processed by data acquisition block 400. In another embodiment of the present invention, the stream of input video includes discrete cosine transform (DCT) compressed video.

In one embodiment of the present invention, the streams of input video are embodied as streams of pixels of video data having associated luma and chroma values. In alternative embodiments, the streams of input video are embodied as streams of transformed or compressed video data. In such embodiments, the transformed video data typically comprises frames of video data that have been compressed by a discrete cosine transform (DCT) and quantization operation, or any other transform or compression (e.g. MPEG, JPEG, wavelet, fractal, or the like).

As shown in FIG. 3, in one embodiment of the present invention, data acquisition block 400 may include a USB interface camera, or the like. In such an embodiment, data acquisition block 400 may receive the pixels of video data, and/or data acquisition block 400 may perform the DCT compression operation. As illustrated, the output of data acquisition block 400 is then input to frame buffer 410. Data acquisition block 400 may alternatively receive the streaming video data from network 440 for input into frame buffer 410.

In one embodiment of the present invention, the stream of video data or compressed video data are derived from "live" video data or compressed video. That is, data acquired from live video cameras or sources. In alternative embodiments, the stream of input video data is derived from archived video files, typically stored on a tangible media. These stored files may be resident on gateway computer 300, or any other computer coupled to gateway computer 300. In one embodiment, data acquisition block 400 performs the DCT compression operation on such incoming data. In an alternative embodiment, the archived video files are stored, in the compressed format on the respective computers systems.

When video data is derived from an external computer, for example, computer system 110, the stream of input video data typically utilizes a real-time streaming protocol known in the industry such as RTP, or the like. In the present embodiment, data acquisition block 400 is also configured process and maintain the appropriate video session time stamps information.

In embodiments of the present invention, the source of video may be a streaming media from a source on a network, such as computer system 110 on network 160. In such a case, the video stream is typically encoded in formats such as, JPEG, JPEG-2000, GIF, WBMP, MPEG-1, MPEG-2, MPEG-4, H.263, *.avi, *.mov, *rm, *.aff, and the like. In this embodiment, data acquisition block 400 includes a decoder block that decodes the data from the encoding format. The decoded data may include pixel intensity values or DCT compressed data. The decoded data is then input and stored into frame buffer 410, as described below.

In the present embodiment, control block 450 is used to control the processing of data within the processing unit. In particular, control block 450 is used to manage transactions over the network via network interface 440. Further, control block 450 is used to manage input video data streams, is used to manage output video data streams, and the like as will be discussed below.

In one example, control block 450 receives information associated with the stream of input video data. Such information typically includes bandwidth parameters such as the spatial resolution of the input video contained within the stream of input video data, the color bandwidth, or color bit-depth, of the input video, the number of frames per second of the input video, and the like. In this embodiment, the information also includes the video format, i.e. how the input stream of data is encoded, such as MPEG format, Windows Media format, H.263, QuickTime format, Real Video format, or the like.

The data associated with the input video data may be derived from the input video data itself. Alternatively, the bandwidth parameters, desired format, and the like may be forwarded to control block 450 before the input video data stream begins.

Control block 450 also receives information associated with desired properties of streams of output video data. Such information typically also includes bandwidth parameters such as the spatial resolution of the output video contained within the stream of output video data, the color bandwidth (color bit-depth) of the output video, the bit rate of the output video, the number of frames per second of the output video, the contrast gain of the output video, and the like. Further, control block 450 also receives information regarding what format the output stream of data should be encoded in, such as M-JPEG, GIF, MPEG format, H.263 format, Windows Media format, Quicktime format, Real Video format, or the like.

The data associated with the output video data is typically derived from the requesting device. For example, in FIG. 1, the requesting device could be computer system 120–140, network appliance 180, or the like. In this embodiment, when the requesting device contacts gateway system 100 to request gateway system 100 send a video stream, the requesting device will also inform gateway system 100 as to the bandwidth requirements. For example, such requirements may include maximum frame rate, color-depth, screen resolution or spatial bandwidth, maximum bit rate, and the like. Further, the requesting device will also inform gateway system 100 which output video format should be used to encode the data. For example, JPEG, JPEG-2000, GIF, WBMP, MPEG-1, MPEG-2, MPEG-4, H.263, *.avi, *.mov, *rm, *.aff, and the like.

In one embodiment of the present invention, the bandwidth data and the format data is forwarded to gateway system 100 along with the request for video data. In an alternative embodiment of the present invention, the requesting device (computer, PDA, cell phone, etc.) merely identifies itself to gateway system 100. In such an embodiment, gateway system 100 receives the identifier, uses the identifier to locate an entry in a database file or other external source that specifies the bandwidth requirements, format requirements, and the like, for that device. Such a file may be resident on gateway system 100, or resident on another computer. Such a file may be compiled based upon manufacturer data, network service provider data, and/or experimental results.

In one embodiment, the identifier may be unique for each class of device. For example, computers having a 56K modem will be in one class, cell phones having low display and processing abilities will be in one class, some cell phones having higher display and processing abilities will be in another class, and the like. Further, super-classes or sub-classes could also be specified which also indicate what type of format is desired.

In still other embodiments, the class may be divided by manufacturers of the device, and/or model of the device. As an example, all set top boxes (such as WebTV) with a 56K modem will be in one class, all cellular telephones based upon Crusoe chips and technology from Transmeta Corporation will be in another class, all PalmOS based devices will be in its own class, Motorola devices will be in another class, and the like. In one embodiment, each different model of device from each manufacturer and/or service provider may send a unique identifier to the computer network.

In response to the unique identifier, gateway system 100 will determine the bandwidth requirements, desired output format, and the like of the device. This data is then passed to control block 450 for processing.

In one embodiment of the present invention, the above data is typically passed to control block 450 before the processing by the blocks in FIG. 3 begins and before video data is output from network block 440. In another embodiment, video data may be output in a default format, until control block 450 receives or determines the desired output bandwidth, format, or the like. Such a default format may be a low bandwidth, low resolution, low frame rate, gray-scale image, or the like. Later, as the desired output bandwidth is determined and processed, the bandwidth and format of the output stream will be adjusted to the desired parameters.

In response to such data, control block 450 manages communication between data acquisition block 400 and frame buffer 410, manages the operation of transcoder block 420, manages the streams of output video data in conjunction with stream caster block 430, and the like.

In the present embodiment, control block 450 is embodied as firmware running on a microprocessor (uP) including program memory, data memory, and the like. In one embodiment, the uP is a Motorola 68XXX processor, although in alternative embodiments of the present invention, DSPs from other manufacturers may be used. In other embodiments of the present invention, control block 450 may be embodied as an application specific integrated circuit (ASIC) or the like.

FIG. 3 also includes frame buffer 410. In the present embodiment, frame buffer 410 is used to buffer the stream of video data from data acquisition block 400, for processing by transcoder block 420. In this embodiment, the type of data and the rate at which frame buffer is updated are fixed by data acquisition block 400, under control of control block 450. In this embodiment, the data stored in frame buffer 410 may include pixels of video data having associated values (uncompressed); frames of video data that have been compressed with a quantized DCT operation; and the like. In one embodiment of the present invention, the video data may be stored in RGB component space, YUV component space, HSV component space, gray scale, and the like.

In one embodiment of the present invention, frame buffer 410 typically includes one or two buffers, each having a frame size of approximately 800 horizontal pixels by 600 vertical pixels (800×600). Each buffer typically has a bit-depth of at least 24 bits in one embodiment. Frame buffer 410 is typically minimally embodied as a 3 Megabyte DRAM, although larger sized memories may also be used. Alternatively, SRAM devices or embedded DRAM, or the like may also be used.

In this embodiment, transcoder block 420 retrieves incoming data from frame buffer 410 fully decompresses or partially decompresses the data, reduces the bandwidth of the data, and forms a stream of output data in a desired format. Transcoder block 420 receives the bandwidth requirements and the desired output format from control block 450. Further detail regarding transcoder block 420 will be given below.

In the present embodiment, stream caster block 430 is typically used to receive a stream of output video data from transcoder block 420 and to format the data for transmission to network interface 440. In this embodiment, network protocols used include TCP/IP protocols, although in other embodiments, other network protocols may also be used. In this embodiment, stream caster block 430 packetizes the output data stream, and determines IP addresses, payload lengths, and the like. Further, stream caster block 430 forwards the data segments into the appropriate TCP socket of network interface 440.

In this example, network interface 440 receives the segmented data from stream caster 430 and transmits the data to a network. The network, may be a computer network 160 such as the Internet, a LAN, or the like. In the present embodiment, the network is TCP/IP based. In the present embodiment, network interface 440 is used to create, monitor, and close all the TCP/IP sockets and RTSP.

In this embodiment, network interface 440 also sends and receives data to and from a network via the TCP/IP sockets and sends incoming data to control block 450. In alternative embodiments, network interface 440 may use other network protocols such as IPX, and other conventional and future-developed network protocols. Further, network interface 440 may use other data streaming protocols such as RTP, and any other conventional and future-developed streaming protocol.

Figure 4:
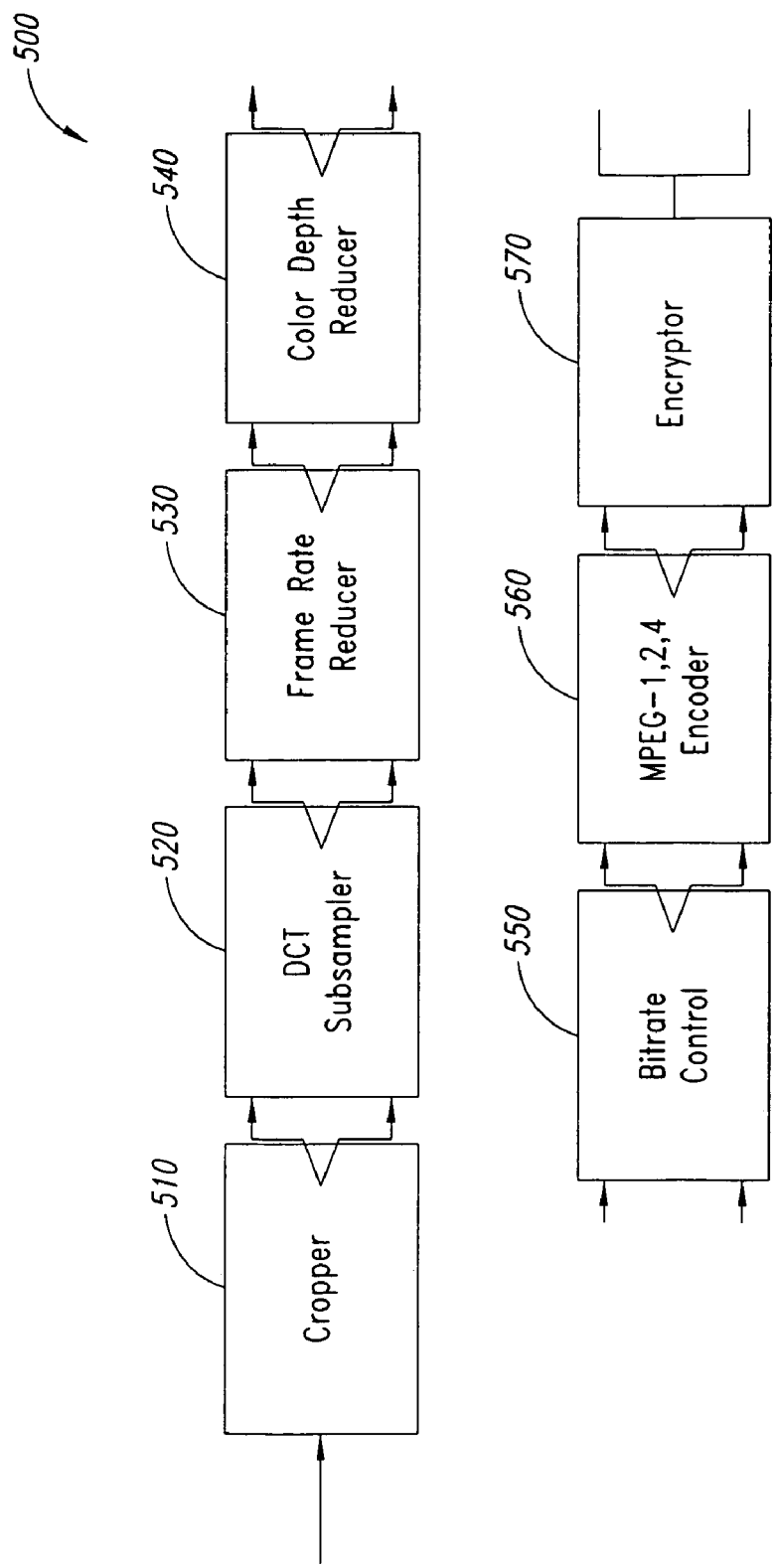
FIG. 4 illustrates a block diagram of a transcoding compound according to an embodiment of the present invention.

FIG. 4 illustrates a block diagram according to an embodiment of the present invention. In particular, FIG. 4 illustrates functional blocks available in a transcoder 500 according to one embodiment. Transcoder 500 includes a cropper block 510, a sampler block 520, a frame rate block 530, a color depth block 540, a bit rate control block 550, an encoder block 560, and an encryptor block 570. As was illustrated in FIG. 3, transcoder 500 is coupled to a frame buffer 410, and outputs data to stream caster 430, in the present embodiment.

In FIG. 4, cropper block 510 retrieves frames of data from frame buffer 410. In this embodiment, cropper block 510 extracts a rectangular region of data from each frame retrieved from frame buffer 410. The extents of the rectangular region are specified in a "stream table" when receiving streaming video data. If no cropping is specified, cropper block 510 merely grabs the whole frame. Cropping is specified when there is a particular portion within a video frame that the requester wants to see.

Also illustrated in FIG. 4 is a sampler block 520 that receives input from cropper block 510. In this embodiment, sampler block 520 receives a desired output spatial resolution from control block 450.

In one embodiment of the present invention, sampler block 520, subsamples the image received from cropper block 510, to obtain the desired output resolution. As an example, an incoming frame may have 640 horizontal pixels×480 vertical pixel resolution, however the desired output video image is 80 pixels×60 pixels. In such an example, cropper block 510 may simply take every eighth pixel of the incoming frame for the output frame. Other methods of subsampling are also contemplated, for example, cropper block 510 may average eight pixels to obtain the value for the output pixel. Other methods, such as filtering, for subsampling are contemplated in alternative embodiments of the present invention.

In another embodiment, sampler block 520, supersamples the image from cropper block 510, to obtain the desired output resolution. As an example, an incoming frame may have an 80×60 pixel resolution, however the desired output video image has a 640×480 pixel resolution. An example of this may be a hand-held wireless video camera transmitting live video to a newsroom computer via the Internet. In such an example, cropper block 510 may use any conventional method for upscaling the image. For example, cropper block 510 may use pixel replication, with or without bi-linear, or bi-cubic filtering techniques, and the like. Other methods for upscaling the incoming frame are contemplated in alternative embodiments of the present invention.

In the present example, frame rate block 530 receives the sampled frames of data from cropper block 510. Frame rate block 530 also receives an indication of a desired frame rate for output video from control block 450, typically in frames per second (fps). In the present embodiment, control block 450 also knows the frame rate of the incoming video, also in fps. This frame rate is also sent to frame rate block 530.

In one embodiment, of the present invention, frame rate block 530 compares the incoming frame rate to the desired output frame rate, and adjusts the number of frames accordingly. For example, frame rate block 530 will drop frames of data to lower the number of frames per second, or will add frames of data to increase the number of frames per second.

In the case where the output frame rate is lower than the input frame rate, frame rate block 530 may use a counter to count to a specific number. When the number is reached, the current frame is dropped, or alternatively, the current frame is not dropped. For example, if the desired frame rate is 10 fps and the incoming frame rate is 11 fps, every time a counter counts to 10, the next frame is simply dropped. As another example, if the desired output frame rate is 5 fps, and the incoming frame rate is 30 fps, every time the counter counts to 6, the next frame is not dropped, but is passed to the next functional block.

In another embodiment, frame rate block 530 may be embodied as a first-in first-out frame (fifo) stack. In such an example, frames of input video are stored in a buffer location specified by a write pointer, and frames of output video are retrieved from a buffer location specified by a read pointer. In operation, every incoming video frame is written into the fifo stack, however, only when the frame is to be output is the write pointer incremented. In such a case, data read out of the fifo stack may be sequential. Still other methods for reducing the frame rate are contemplated in alternative embodiments of the present invention.

In an alternative embodiment of the present invention, frame rate block 530 will add frames to increase the frame rate. For example, if the incoming frame rate is 10 fps, and the desired frame rate is 20 fps, frame rate block 530 will add frames to the video stream every other frame. One technique for increasing the numbers of frames involves interpolating the motion vectors of blocks in the frames. Many other methods for adding frames and increasing the frame rate are contemplated in alternative embodiments of the present invention, however are outside the scope of the present technical disclosure.

In the example in FIG. 4, color depth reducer block 540 sequentially receives the frames of data from frame rate block 530. In one embodiment, color depth reducer block 540 also receives an indication of the bit-depth for pixels in the incoming frame of data, and the desired bit-depth. In the present embodiment, in response to the bit depths, color depth reducer block 540 maps the number of bits from the input frame to the desired number of bits in the output frame.

As an example, the incoming image may have a 30 bit bit-depth, for example three component color having 10 bits of hue data, 10 bits of saturation data, and 10 bits of intensity data; the desired bit depth of the output frame may be 6 bit gray scale. In such an example, to reduce the color depth, color depth reducer block 540 may take only the 6 most significant digits in the intensity data for the output frame.

In another example, the incoming image may have a 24 bit bit-depth, for example, an RGB image having 24 bits of information (8:8:8), and the desired bit depth of the output frame may be 256 colors, or 8-bit color. In such an example, color depth reducer may re-map or dither, the values from the 24 bit color space into the 8 bit color space. Such dithering techniques are well known. In alternative embodiments, other types of techniques may be used to reduce the bit depth from an input video frame to obtain a desired output frame bit-depth.

In alternative embodiments of the present invention, increasing the color bit-depth may also be performed, using known techniques.

In the present embodiment, bitrate control block 550 receives the output from color depth reducer block 540. In the present embodiment, bit rate control block 550 also receives a desired output bit rate from control block 450. For M-JPEG encoding, bit rate control block 550 is used to statistically compute a new quantization scale factor for the data so that the effective bit rate more closely matches the desired output bitrate.

In the present embodiment, a quantization scale factor is first determined. The quantization scale factor is used to compress or expand a frame of data so that it more closely matches the desired output bit rate. In theory, in one embodiment the quantization scale factor is equivalent to a modulus (Mod) operator, or a most significant bits (MSBs) operator. In such cases, the differences between pixels that are close in value (e.g. 20 and 21), are ignored. As another example, values 20–23 may be considered the same as 20.

In this example, the quantization scale factor is determined by analyzing the number of bits per second are produced by a t0 frame of data. The number of bits is divided by the frame time to obtain a calculated bit rate in this embodiment. This calculated bit rate is compared to a desired bit rate to obtain the quantization scale factor.

The quantization scale factor is then applied to scale the next frame of data, a t1 frame of data. Continuing the example above, the next frame of data may be scaled by 2, so that the bit rate of the next frame of data will be 10 kbps. In the present embodiment, bit rate scaling is performed by reducing the effective color depth by the quantization scale factor, to meet the desired bandwidth requirements. In this example, the color depth is halved, i.e. the bottom least significant bits (LSBs) are ignored.

In one embodiment of the present invention, bit rate control block 550 monitors each frame, and attempts to control the bit rate to match the desired output bit rate for virtually all frames. In some embodiments, the quantization scale factor is updated every frame time, and in other embodiments, the quantization scale factor may be updated every Xth frame time. Where X is selectable automatically or manually.

In an alternative embodiment, a more simplistic techniques is utilized. In such an embodiment, if the incoming bit rate is above the desired output bit rate, a predetermined quantization scale factor is applied to the next frame. Further, if the incoming bit rate is below the desired output bit rate, another predetermined quantization scale factor is applied to the next frame. In such an embodiment, such predetermined quantization scaling factors may be selected ahead of time, based on empirical data, or the like. Still, in other embodiments of the present invention may provide for increasing the effective bit rate.

In FIG. 4, encoding block 560 next receives the bit-rate adjusted frames of data. Encoding block 560 may also receive a request for an encoding data format, specified for by control block 450. In the embodiment illustrated in FIG. 4, encoding block 560 is embodied as an MPEG encoder. Encoding block 560 may include dedicated hardware encoders, such as those available from Sigma Designs, and the like.

In the present embodiment, for MPEG-1, MPEG-2, and MPEG-4 encoding, it is contemplated that I-frame data will be compressed. In another embodiment, P-frames, and even B-frames may also be compressed. For MPEG-4 encoding, it is contemplated that both I-frame data and P-frame data be compressed for transmission purposes. Detail description of I, P, and B frames are outside the scope of this technical disclosure.

In other embodiments of the present invention, alternative formats may specified, for example *.avi format video, *.mov format video, streaming video such as in the *.rm format from Real Networks, or *.aff format from Microsoft, or the like. Such formats may be in the public domain, or proprietary. Further, encoding block 560 may be embodied as specialized dedicated hardware, or as software routines on a digital signal processor (DSP), a microprocessor (Athlon, PentiumIII), or the like.

After encoding, the video data may be encrypted by encryptor block 570.

The above embodiment was illustrated in FIG. 4 as having specified interconnections between blocks. However, in alternative embodiments of the present invention, the different blocks may be interconnect in different ways, and may be dynamically interconnected in different ways. As an example, an incoming frame may include 24-bits of 640×

280 color image whereas the desired output image is an 8 bit 80×60 gray scale image. In such an example, it is preferable to reduce the color depth information, before subsampling the image for sake of efficiency. In such a case, the data is passed to the color depth reducer 540 then to the sampler block 520. The interconnections between the blocks, and the data flow may be dynamic, and change according to specific need.

If implemented in hardware or partially in hardware, an efficient multiplexer or cross-bar mechanism can be used for embodiments of the present invention. If implemented in software, little if any additional hardware interconnections are typically required.

Figure 5A:
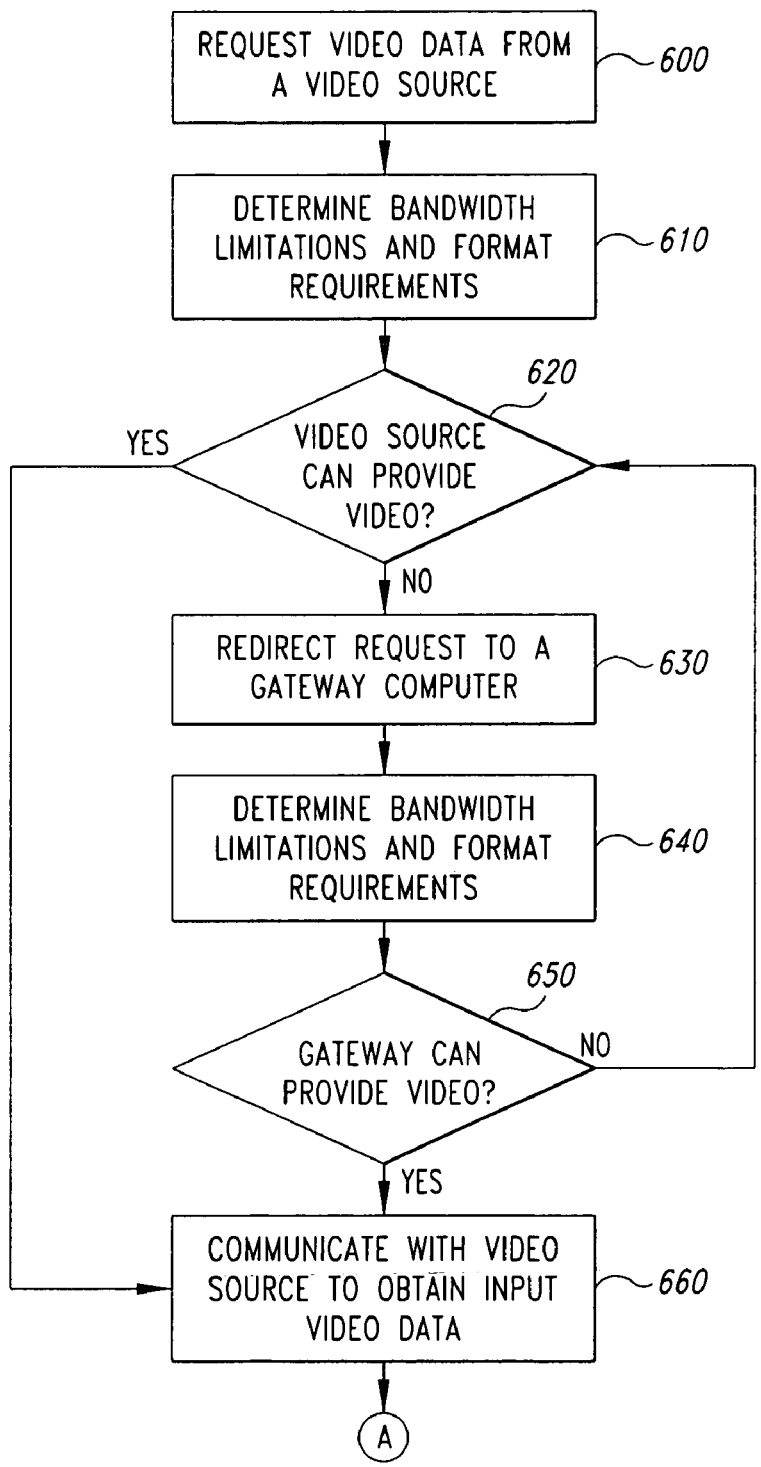
FIGS. 5A and 5B illustrates an overview flow diagram according to an embodiment of the present invention.
Figure 5B:
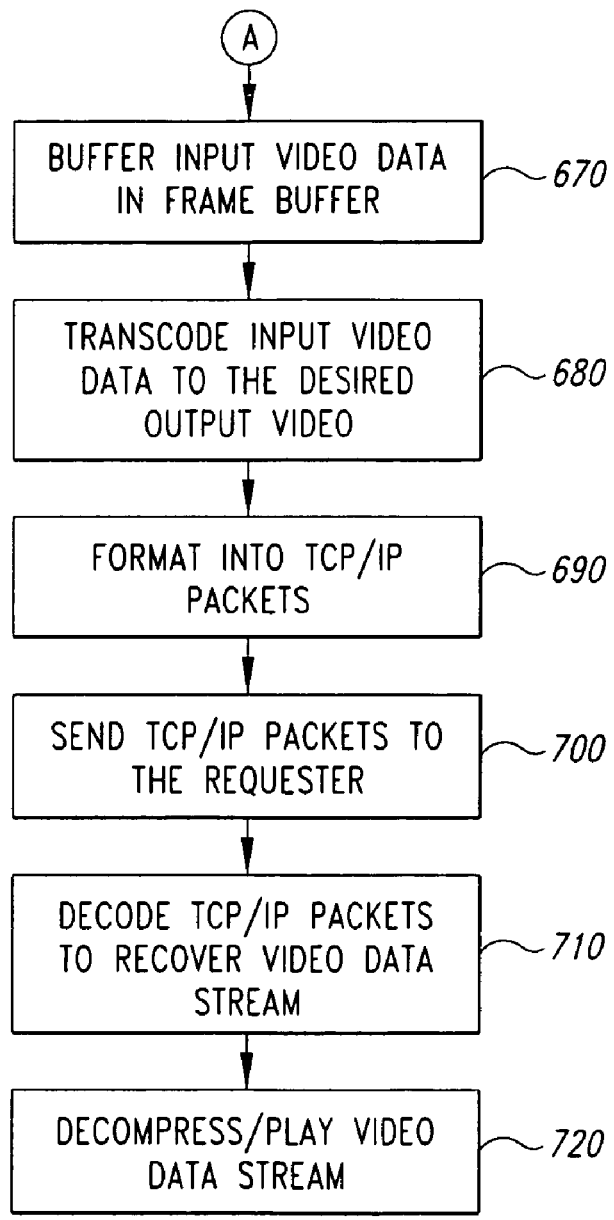

FIGS. 5A and 5B is an overview flow diagram according to an embodiment of the present invention.

Initially, a device requests a stream of video data from a video source, step 600. This step may be initiated by a user of a cellular telephone (requesting device) navigating the web, for example, and requesting to be coupled to the video source. An example of this is a commuter trying to connect with highway traffic cameras on the web, so she can see which way is the best way home.

Included with this request may be an indicator of the type of device she is calling from. For example, a cellular telephone, a wireless PDA, or the like. In response to the identifier, the video source determines the bandwidth requirements and desired format of the device, step 610. As discussed previously, the request for the stream of video data may include the bandwidth and format requirements, in one embodiment. In other embodiments of the present invention, the identifier simply identifies the class of the device, the manufacturer of the device, the model of the device, the class of service and quality of service, or the like. Based upon one or more of these identifiers, the bandwidth and format requirements may be determined by the video source.

In the present embodiment, the video data requirements of the requesting device may vary widely. For example, the output video streams may be of different file or video formats, may have different color depths, may have different frame rates, may have different bit rates, and the like. As an example, embodiments of the present invention may output video streams having output resolutions as little as 8×8. More typically, the output video is a multiple of a frame approximately 80×60 pixels. For example, the output video may have a spatial bandwidth of approximately 160×120, 320×240, 640×480, or virtually any resolution in-between. As another example, for Real Media format, encoding frames sizes of approximately 352×288 and 176×144 are typical. In alternative embodiments, the output resolution may be as little as 1 pixel.

In embodiments of the present invention, the output frame rate specified are typically up to 30 frames per second, since the input frame rate from video cameras, 30 fps, is typically the limiting factor. In other embodiments, other output frame rates may be specified, for example 5, 15, 29 fps, and the like.

In this example, the bit-depth of the output video may vary from 1 bit up to 30 bits. In this embodiment, 30 bits are typically split into 3 components of 10 bits of data each, for example, RGB, HSV, or the like. Greater than 10 bits may be provided for each component in the future, as camera/sensor technology increases.

The maximum bit rate for the output video data stream may also be specified by the requesting device, in the present embodiment.

In this embodiment, the source determines whether it can handle the video request from the device, step 620. For example, the source may determine whether the desired format is one which the source supports, the source may determine whether it has the bandwidth to support the device, or the like. If not, the source redirects the device to a known gateway computer, as discussed above, step 630.

In the present embodiment the gateway computer also determines the bandwidth requirements and desired format of the device, step 640, in a similar manner as described above. Alternatively, the source may re-transfer the bandwidth and format requirements to the gateway computer.

In this embodiment, the gateway computer also determines whether it can handle the request from the device, step 650. For example, the gateway may determine whether the desired format is one which is supported, the gateway may determine whether it has the bandwidth to serve the device, and the like. In this embodiment, if the gateway computer cannot handle the load, the gateway "bounces" the request back to the source, step 660. In such a case, the source may determine whether it can now handle the request, and/or whether a different gateway computer can handle the request.

In the next step, the gateway communicates with the video source and in return begins to receive an input stream of video data, step 660. In embodiments of the present invention, the input stream of video data use RTP or other data streaming protocols.

Different input streams may be of different file or video formats, color depth, and the like. For example, embodiments of the present invention may receive input from sources having an input resolution as little as 8×8. More typically, the input video is a multiple of a frame approximately 80×60 pixels. For example, the input video may have a spatial bandwidth of approximately 160×120, 320×240, 640×480, or virtually any resolution in between. In one embodiment, Real Media format, for example, encodes at resolutions of approximately 352×288 and 176×144.

In the present embodiment, the input frame rate is typically up to 30 frames per second, because most video cameras produce a maximum of 30 frames per second. In other embodiments of the invention, other input frame rates may also be used, for example 7, 15, 29 fps, and the like.

The bit-depth of the input video may also vary from 1 bit up to 30 bits in the current embodiment. In this embodiments of the present invention, 30 bits provides 10 bits of data information to each color component, e.g. RGB, HSV, YUV or the like. In future embodiments, more than 10 bits may be provided for each component, based upon improvements on camera/sensor design.

In response to the input video data stream, frames of data are buffered and are stored in the frame buffer, step 670. In the present embodiment, the type of data, at rate at which the frame buffer is updated, is controlled by a control block.

In one embodiment of the present invention, the video data may be uncompressed, for example, where each pixel represents the intensity data. In an alternative embodiment, the video data may be in a compressed form, for example, a quantized wavelet transform on the frame of the video.

Next, the transcoder retrieves the frame of data and formats the data according to the bandwidth and format requirements for the output video stream, step 680. Further details regarding this step will be given below.

Once the data has been bandwidth reduced and format encoded, the stream of data is encoded for transmission via RTP or other protocol, step 690. In alternative embodiments of the present invention, other network transmission formats may be used, for example IPX, or the like. The data is then transmitted to the requesting device, step 700.

In the present embodiment, the requesting device receives the packets of data and strips the RTP headers to recover the stream of data, step 710. The data stream is then typically decompressed and then displayed on the requesting device, step 720. For example, the requesting device will retrieve MPEG-4 data, and then play that data to its display. As an example, the user may see that there is a traffic jam on the highway.

In alternative embodiments, other types of formats may be used, for example, AVI, MPG, MOV, XING and the like. In still other embodiments, other formats, including other proprietary formats may also be specified and used by the requesting device.

Figure 6A:
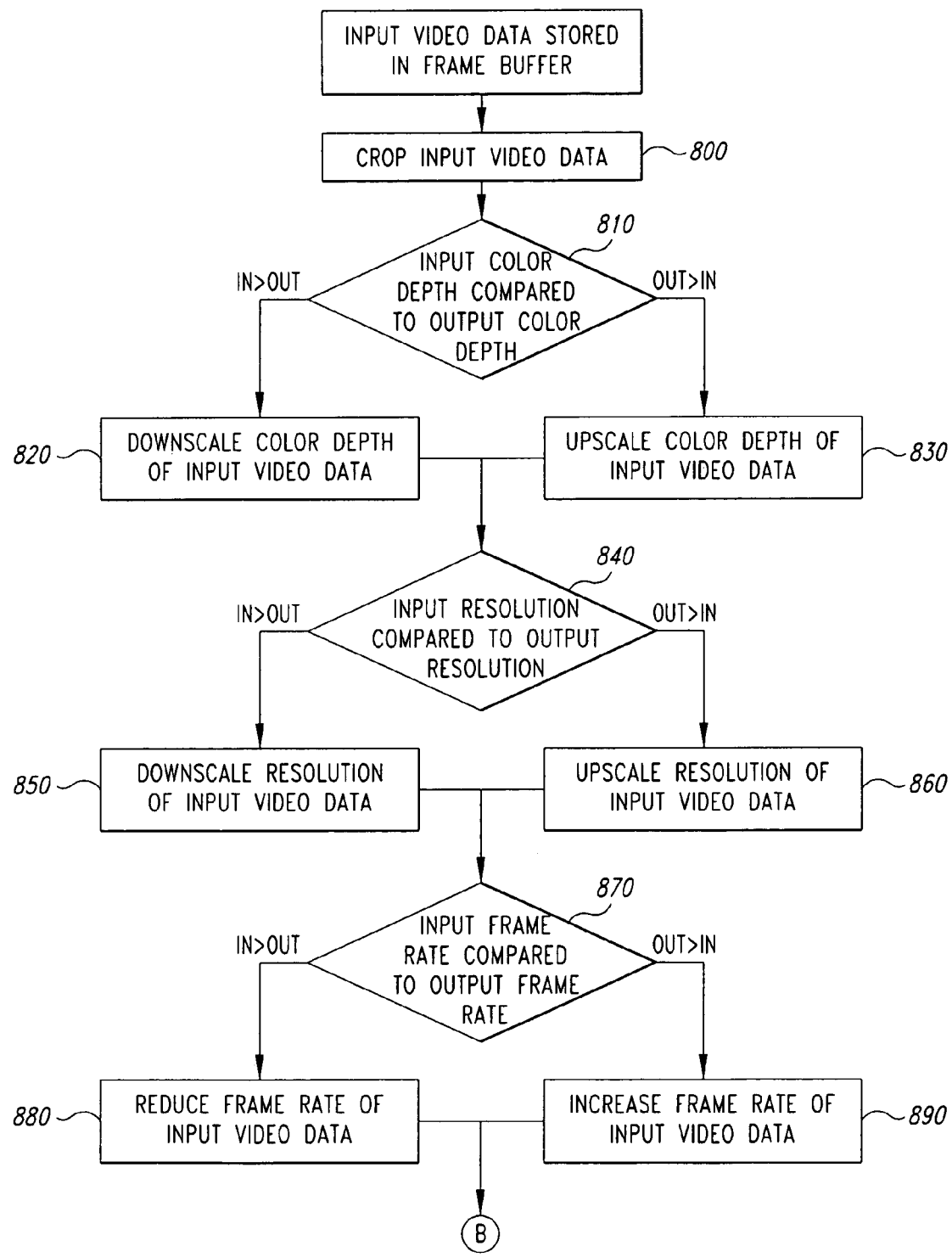
FIGS. 6A and 6B illustrates a more detailed embodiment of the present invention.
Figure 6B:
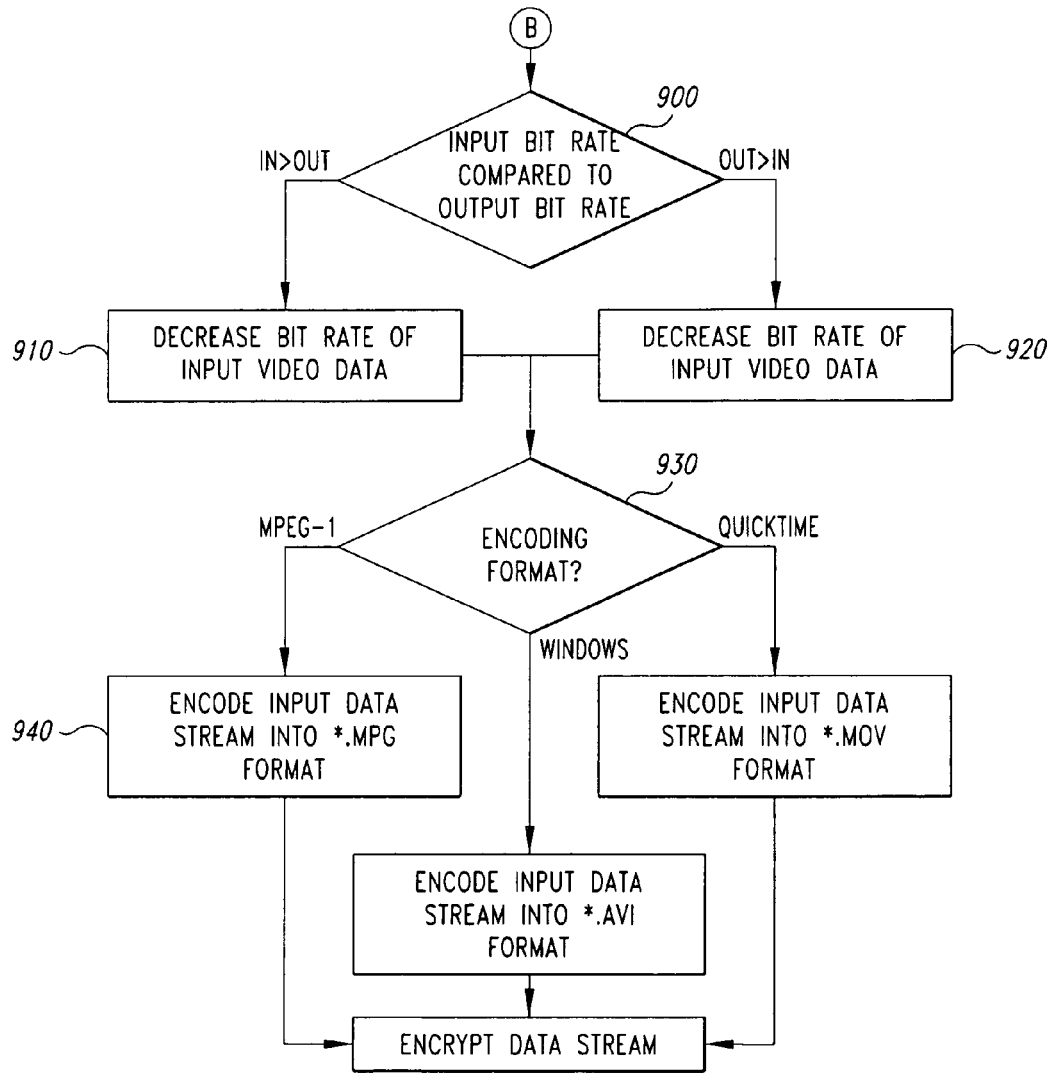

FIGS. 6A and 6B illustrates a more detailed embodiment of the present invention. In particular, FIGS. 6A and 6B illustrates a block diagram of a transcoding process according to one embodiment.

As disclosed above, a frame of input video data is initially put into the frame buffer. In the present embodiment, when the data is derived from a streaming or file video source, the first step, if needed, is to crop the data in the frame buffer to obtain the input video data, step 800.

Next, it is determined whether the color-depth of the input frame is larger or smaller than the desired output color depth, step 810. In the present embodiment, a control block may make this determination, and the result of this comparison may be simply sent to a color depth reduction unit.

In one case where the input color depth is larger than the desired output color depth, the input frame of data is dithered to achieve the desired output color depth, step 820. For example, if the input color depth includes 30 bit RGB color (10: 10: 10), and the desired output color depth is 24 bit RGB color (8:8:8), the color depth of the input frame should be reduced. One method to achieve this is, is to merely take the most significant (MSB) 8 bits from each component (R,G,B) to obtain the 24-bit RGB color (8:8:8). In alternative embodiments of the present invention, other methods of reducing color depth are contemplated. For example, different techniques are typically used when receiving video data in different component spaces, such as YUV, HSV, and the like.

In one case where the input color depth is smaller than the desired output color depth, the input frame of data is typically scaled to the output color depth, step 830. For example, if the input color depth is 8 bits and the desired output bit depth is 10 bits, the input frame bit depth may be scaled up. One method to achieve this upscaling would be to simply use the X number of bits of the input pixel values, as the X number of most significant bits (MSBs) in the desired output color depth. In the example above, the two least significant bits (LSBs) of the output frame may be padded with 0s, 1s or the like. In other embodiments of the present invention, any number of upscaling techniques may also be used.

Next, it is determined whether the resolution of the input frame is larger or smaller than the desired output resolution, step 840. In the present embodiment, a control block may make this determination, and the result of this comparison may be sent to a sampler unit.

In one case where the input resolution is larger than the desired output resolution, the input frame of data is subsampled to approximately achieve the desired output resolution, step 850. For example, if the input resolution is 640×480 and the desired output resolution is 320×240, the input frame resolution should be reduced. One method to achieve subsampling would be to use every Xth pixel in every Xth line for the output image. Using the example above, X would be 2, to achieve 320×240 resolution, and the like.

In alternative embodiments of the present invention, other methods of subsampling are contemplated. For example, the average of a number of pixels surrounding a pixel could be used for the output image.

In one case where the input resolution is smaller than the desired output resolution, the input frame of data is supersampled to approximately achieve the desired output resolution, step 860. For example, if the input resolution is 160×120 and the desired output resolution is 320×240, the input frame resolution should be increased. One method to achieve upscaling would be to use pixel replication techniques. Interpolation techniques using bilinear or bi-cubic filters could be employed to provide a more acceptable image. In still other embodiments of the present invention, any number of upscaling techniques may also be used.

In the present embodiment, it is next determined whether the frame rate of the input frame is greater or lesser than the desired output frame rate, step 870. In the present embodiment, a control block may make this determination, and the result of this comparison may be simply sent to a frame rate reduction unit.

In one case where the frame rate is higher than the desired output frame rate, frames of the input image are dropped, step 880. For example, if the input frame rate is 30 frames per second (fps) and the desired output frame rate is 10 fps, the input frame rate should be reduced. In such an embodiment, two of every three input frames need to be dropped, and the remaining input frame is used for output. Embodiments may include a counting mechanism to identify which frames are to be dropped, or which frames will not be dropped.

In alternative embodiments of the present invention, other methods for adjusting the frame rate are contemplated. For example, instead of dropping frames, frames may be interpolated and output. For example, in the example above, the motion vectors of three frames may be interpolated together to form the motion vectors of one output frame. Other techniques are also contemplated.

In one case where the input frame rate is lesser than the desired output frame rate, frames may be added to the input frames, step 890. For example, if the input frame rate is 5 fps and the desired output frame rate is 10 fps, the number of frames should be increased. One method to add frames simply by duplicating the previous frame. Another method is to add frames is by averaging frames about the added frame. In still other embodiments of the present invention, any number of techniques for adding frames may also be used.

In this embodiment, for non-MPEG encodings, the next step is to determine whether the bit rate of the input frame is greater or lesser than the desired output bit rate, step 900. In the present embodiment, a control block may help make this determination, and/or the result of this comparison may be simply sent to a bit rate control unit. In the present embodiment, the bit rate of a first input image is first determined. This bit rate is compared to the desired bit rate, and in response, a quantization scale factor is determined. This quantization scale factor is then applied to scale the next input image.

In one case where the bit rate is higher than the desired output bit rate, the bit rate of the input image is reduced, step 910. For example, if the input bit rate is 20 kilo bits per second (kbps) and the desired output bit rate is 10 kbps, the input bit rate should be reduced. In such an embodiment, the quantization scale factor is computed based on known statistical algorithms. The next input image is assumed to be approximately the same bit rate (20 kbps), thus it is scaled by 2 to reduce the bit rate to 10 kbps.

In the present embodiment, reducing the bit rate by the scaling factor is accomplished by dynamically reducing the effective bit depth of the DCT data in the frame. For example, the input frame may include pixels having DCT values 1, 2, 3, 4, 5, 6, 9, 10 but the corresponding output pixels, after scaling, may have the respective values 0, 0, 0, 4, 4, 4, 8, 8. As illustrated in this example, the two LSB are ignored, thus there are 4 times fewer output DCT values. The reduction of DCT values thus reduces the number of output bits, and thus reduces the output bit rate.

In alternative embodiments of the present invention, other types of techniques can be used to reduce the output bit rate.

In one case where the input bit rate is less than the desired output bit rate, data may be added to the input frames, step 920. For example, if the input bit rate is 10 kilo bits per second (kbps) and the desired output bit rate is 20 kbps, the input bit rate may be increased. In such an embodiment, the quantization scale factor can then be calculated, as above, and the scale factor can then be applied to the next input frame.

In the present embodiment, increasing the bit rate by the scaling factor is accomplished by dynamically increasing the effective bit depth of the frame. For example, the input frame may include pixels having values 2, 2, 2, 4, 4, 8, 8, 16, 16, (out of 16) but the corresponding output pixels, after scaling, may have the respective values 32, 32, 32, 64, 64, 128, 128, 256, 256 (out of 256). Then the pixels may be averaged with adjacent pixels to obtain a higher quantization level. Other sorts of techniques for increasing the number of bits are contemplated in other embodiments of the present invention.

In the present embodiment, the determination of the quantization scale factor occurs at every frame. The scale factor is then applied to the next frame. In alternative embodiments of the present invention, the quantization scale factor may be recalculated less often, depending upon the type of input video data, the processing power, and the like.

The next step in this example is to determine the data encoding format, step 930. In the present embodiment, a control block may make this determination. Next, in the present embodiment, the data from the bit rate control circuit is input into the appropriate encoding block, step 940.

After encoding the video data stream, the stream may also be encrypted using known cryptographic methods.

In one embodiment of the present invention, the encoding format may include MPEG-1, MPEG-2, MPEG-4, *.avi, *.mov, *.rm, *.aff, and the like. In other embodiments, sub-groups of these formats may only be supported, for example, one system may only provide MPEG-4 and Quicktime encoding. In other embodiments, additional encoding formats, and streaming media formats may also be supported.

One embodiment of an encoder is based primarily upon hardware encoders, however, these encoders may also be implemented by software routines.

In the foregoing specification, the invention has been described with reference to specific exemplary embodiments thereof. Many changes or modifications are readily envisioned. For example, the computer network 210 may be a LAN, or other type of network.

In light of the present patent application, the addition of other functionality in alternative embodiments is certainly envisioned. For example, not all functional blocks are necessary for an transcoder as was described above. In the above example, a transcoder included a cropper, a sampler, a frame rate adjuster, a color depth adjuster, a bit rate adjuster, an encoder, and an encryptor. In alternative embodiments, any one or more may be used as a transcoder. For example, one transcoder may simply include a subsampler, and a color bit depth reducer; another transcoder may include a frame rate reducer. Further, portions may be implemented outside the transcoder. For example, an encoder may be considered separate from the transcoder.

In still other embodiments, a gateway system 100, transcoder 420, and the like output streams of video at different formats at the same time. As an example, gateway system 100 provides an MPEG-4 video stream of data at 640×480 24 bit color images at 30 fps. At the same time, gateway system 100 provides a Quicktime video stream of data at 160×120 16 bit color images at 20 fps. And at the same time, gateway system 100 provides a Windows Media video stream of data at 80×60 8-bit gray image at 5 fps. Many such combinations are included in the present embodiments.

In still other embodiments, the transcoder may be based virtually all on software. In other embodiments, the transcoder may be software code for a DSP, a microprocessor, or the like. In still other embodiments, the transcoder may include specialized hardware with software code for a DSP microprocessor and other specialized hardware units. Because not all of the above functional blocks are necessary for embodiments of the present invention, a software transcoder may be effectively used in computer systems such as computer system 110, in FIG. 1, or the like.

The foregoing description of preferred embodiments of the present invention has been provided for the purposes of illustration and description. It is not intended to be exhaustive or to limit the invention to the precise forms disclosed. Obviously, many modifications and variations will be apparent to the practitioners skilled in this art.

The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A circuit at a network device and which is configured to form an output video stream, the circuit comprising:
   a cropper block to receive a plurality of video frames from a frame buffer and to extract at least a portion of each video frame;
   a resolution modification circuit configured to receive the plurality of video frames from the cropper block, and configured to modify resolution of the plurality of video frames, if a desired resolution for the output video stream is different than a resolution of an input video stream, the plurality of frames being derived from the input video stream;
   a frame reduction circuit coupled to the resolution modification circuit configured to reduce a number of video frames in the plurality of video frames from the resolution modification circuit, if a desired frame rate for the output video stream is different than a frame rate of the input video stream;
   a depth reduction circuit coupled to the frame reduction circuit configured to reduce bit depth of the plurality of video frames from the frame reducing circuit, if a desired bit depth for the output video stream is different than a bit depth of the input video stream;

a rate reduction circuit coupled to the depth reduction circuit, configured to scale the plurality of video frames from the depth reduction circuit, in response to a desired bit rate for the output video stream, which is a different bit rate than other output video streams from the network device;

an encoder coupled to the rate reduction circuit, configured to encode the plurality of video frames from the rate reduction circuit into the output video stream, wherein the cropper block, resolution modification circuit, frame reduction circuit, depth reduction circuit, rate reduction circuit, and encoder can share data with each other and form part of a transcoder block at the network device that receives a single input video stream having the plurality of video frames, the transcoder block having a plurality of encoders, each of the plurality of encoders at the network device being capable to generate an output video stream that is different than other output video streams simultaneously generated by other encoders at the network device, in a manner that the network device can select and send multiple different simultaneous output video streams having different bit rates corresponding to respective multiple different client device characteristics and channel conditions, at least some of the simultaneous output video streams having a bit rate that exceeds a bit rate capability of a least-capable client device; and an encryptor block to encrypt at least one of the output video streams, wherein a horizontal resolution of a frame from at least one of the output video streams is a fractional multiple of a horizontal resolution of a video frame from the plurality of video frames derived from the input video stream, wherein at least some of the output video streams can have same encoding formats but differences in frame rates, bit rate, color depth, color format, or resolution, wherein if the input video stream includes compressed digital data, the transcoder block is configured to de-compress the compressed digital data into decompressed data and to re-compress the decompressed data so that some of the multiple simultaneous output video streams have different compression formats, and wherein the resolution modification circuit, frame reduction circuit, depth reduction circuit, rate reduction circuit can perform at least one of upsample, increase number of frames, increase color depth, and increase bit rate, respectively, of the simultaneous output video streams during transmission if the client device characteristics or channel conditions permit such increases, and wherein the resolution modification circuit, frame reduction circuit, depth reduction circuit, rate reduction circuit can perform at least one of subsample, decrease number of frames, decrease color depth, and decrease bit rate, respectively, of the simultaneous output video streams during transmission if desired characteristics for the output video streams require a reduction from those of the input video stream.

2. The circuit of claim 1 wherein some of the encoders of the transcoder block are configured to encode the plurality of video frames from their respective rate reduction circuit into a respective plurality of different encoding formats.

3. The circuit of claim 2 wherein the plurality of different encoding formats includes formats compatible with client devices that are to receive the output video streams.

4. The circuit of claim 1 wherein the desired resolution for at least one of the output video streams is a multiple of 8 horizontal pixels by 8 vertical pixels.

5. The circuit of claim 1 wherein the input video stream includes uncompressed video data.

6. The circuit of claim 1 wherein the different compression formats of the simultaneous output video streams include both MPEG and non-MPEG compression formats.

7. A method usable at a network device for converting a single input video stream to at least one output video stream, the method comprising:

deriving at least one of a specification of a resolution, a frame rate, a color depth, and format for the output video stream;

deriving at least one of a specification of a resolution, a frame rate, a color depth, and format for the input video stream;

obtaining a plurality of video frames from the input video stream;

cropping each video frame from the plurality of video frames to extract at least a portion of each video frame;

resizing each video frame from the plurality of video frames, if the resolution for the output video stream is different from the resolution of the input video stream;

changing a number of video frames from the plurality of video frames, if the frame rate for the output video stream is different from the frame rate of the input video stream;

changing color depth for video frames from the plurality of video frames, if the color depth for the output video stream is different from the color depth of the input video stream;

converting the plurality of video frames of the input video stream to the output video stream in response to the format for the output video stream, wherein the cropping, resizing, changing number of video frames, changing color depth, and converting can share data with each other and are performed in a transcoding session at the network device that simultaneously generates multiple unique output video streams from the input video stream, each simultaneous output video stream being adapted from the input video stream based on both characteristics of client devices that are to respectively receive the simultaneous output video streams and channel conditions to the client devices, in a manner that the network device can select and simultaneously send the multiple unique output video streams having different bit rates that correspond to multiple different client device characteristics and channel conditions, at least some of the simultaneous output video streams having a bit rate that exceeds a bit rate capability of a least-capable client device; and encrypting at least one of the output video streams, wherein a horizontal resolution of a frame from at least one of the output video streams is a fractional multiple of a horizontal resolution of a video frame from the plurality of video frames from the input video stream, wherein at least some of the output video streams can have same encoding formats but differences in frame rates, bit rate, color depth, color format, or resolution, wherein if the input video stream includes compressed digital data, the transcoding session de-compresses the compressed digital data into decompressed data and re-compresses the decompressed data so that some of the multiple simultaneous output video streams have different compression formats, and wherein at least some of resizing, changing color depth, changing number of frames, and changing bit rate includes:

at least one of upsampling, increasing color depth, increasing number of frames, and increasing bit rate, respectively, of the simultaneous output video streams during transmission if the characteristics of client devices or channel conditions permit such increases; and at least one of subsampling, decreasing color depth, decreasing number of frames, and decreasing bit rate, respectively, of the simultaneous output video streams during transmission if desired characteristics for the output video streams require a decrease from those of the input video stream, wherein the increasing and decreasing can be performed dynamically and differently for each of the simultaneous output video streams, in response to changes in either or both client device characteristics or channel conditions during transmission.

8. The method of claim 7, further comprising:

deriving a specification of a bit rate for the output video stream, including providing the output video stream with a bit rate that is different than other output video streams from the network device; and determining at least one type of scale factor for the plurality of video frames; and wherein converting the plurality of video frames comprises converting the plurality of video frames to the output video stream in response to the format for the output video stream and in response to the scale factor.

9. The method of claim 7 wherein the format for the output video stream comprises an standard compatible with the respective client devices.

10. The method of claim 7 wherein the format for at least one of the output video streams comprises a streaming format.

11. The method of claim 7 wherein the resolution for at least one of the output video streams is a multiple a resolution of 8 horizontal pixels by 8 vertical pixels.

12. The method of claim 7 wherein changing color depth for video frames from the plurality of video frames occurs before resizing each video frame from the plurality of video frames.

13. The method of claim 7 wherein the input video stream includes color data and at least one of the output video streams includes only monochromatic data.

14. The method of claim 7 wherein the resolution for at least one of the output video streams is a multiple resolution of 8 horizontal pixels by 8 vertical pixels, if sampling in a DCT domain.

15. The method of claim 7 wherein deriving the formats of the input and output video streams includes deriving either or both a color format and an encoding format.

16. A system at a network device for converting an input video stream to an output video stream, the system comprising:

a means for deriving at least one of a specification of a resolution, a frame rate, a color depth, and format for the output video stream;

a means for deriving at least one of a specification of a resolution, a frame rate, a color depth, and format for the input video stream;

a means for obtaining a plurality of video frames from the input video stream;

a means for cropping each video frame from the plurality of video frames to extract at least a portion of each video frame;

a means for resizing each video frame from the plurality of video frames, if the resolution for the output video stream is different from the resolution of the input video stream;

a means for changing a number of video frames from the plurality of video frames, if the frame rate for the output video stream is different from the frame rate of the input video stream;

a means for changing color depth for video frames from the plurality of video frames, if the color depth for the output video stream is different from the color depth of the input video stream;

a means for converting the plurality of video frames to the output video stream in response to the format for the output video stream, wherein the cropping, resizing, changing number of video frames, changing color depth, and converting and a plurality of encodings can share data with each other and are performed in a transcoding session at the network device that simultaneously generates multiple unique output video streams from the input video stream, each simultaneous output video stream being adapted from the input video stream based on both characteristics of client devices that are to respectively receive the simultaneous output video streams and channel conditions to the client devices, in a manner that the network device can select and simultaneously send the multiple unique output video streams having different bit rates to corresponding multiple different client devices, at least some of the simultaneous output video streams having a bit rate that exceeds a bit rate capability of a least-capable client device; and a means for encrypting at least one of the output video streams, wherein a horizontal resolution of a frame from at least one of the output video streams is a fractional multiple of a horizontal resolution of a video frame from the plurality of video frames from the input video stream, wherein at least some of the output video streams can have same encoding formats but differences in frame rates, bit rate, color depth, color format, or resolution, wherein if the input video stream includes compressed digital data, the transcoding session de-compresses the compressed digital data into decompressed data and re-compresses the decompressed data so that some of the multiple simultaneous output video streams have different compression formats, and wherein at least some of the means for resizing, for changing color depth, for changing number of frames, and for changing bit rate includes:

at least one means for upsampling, for increasing color depth, for increasing number of frames, and for increasing bit rate, respectively, of the simultaneous output video streams during transmission if the characteristics of client devices or channel conditions permit such increases; and at least one means for subsampling, for decreasing color depth, for decreasing number of frames, and for decreasing bit rate, respectively, of the simultaneous output video streams during transmission if desired characteristics for the output video streams require a decrease from those of the input video stream, wherein the increasing and decreasing can be performed dynamically and differently for each of the simultaneous output video streams, in response to chances in either or both client device characteristics or channel conditions during transmission.

17. The system of claim 16 wherein the means for deriving the formats of the input and output video streams include means for deriving either or both a color format and an encoding format.

* * * * *